United States Patent
Wu et al.

(10) Patent No.: US 10,509,441 B2
(45) Date of Patent: Dec. 17, 2019

(54) FOLDABLE DISPLAY DEVICE

(71) Applicant: BOE TECHNOLOGY GROUP CO., LTD., Beijing (CN)

(72) Inventors: Zhongbao Wu, Beijing (CN); Zhihong Du, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/773,866

(22) PCT Filed: Oct. 13, 2017

(86) PCT No.: PCT/CN2017/106051
§ 371 (c)(1),
(2) Date: May 4, 2018

(87) PCT Pub. No.: WO2018/196290
PCT Pub. Date: Nov. 1, 2018

(65) Prior Publication Data
US 2019/0073002 A1    Mar. 7, 2019

(30) Foreign Application Priority Data
Apr. 26, 2017    (CN) .......................... 2017 1 0283249

(51) Int. Cl.
*G06F 1/16* (2006.01)
*H04M 1/02* (2006.01)

(52) U.S. Cl.
CPC .......... *G06F 1/1652* (2013.01); *G06F 1/1616* (2013.01); *G06F 1/1618* (2013.01);
(Continued)

(58) Field of Classification Search
CPC .... G06F 1/1641; G06F 1/1652; G06F 1/1616; G06F 1/1618; G06F 1/1626; G06F 1/1681
See application file for complete search history.

(56) References Cited

U.S. PATENT DOCUMENTS 9,071,673 B2 *   6/2015  Choi ................... H04M 1/0216
9,164,547 B1 *  10/2015  Kwon .................. G06F 1/1656
(Continued)

FOREIGN PATENT DOCUMENTS

CN    103985315 A    8/2014
CN    105321430 A    2/2016
(Continued)

OTHER PUBLICATIONS

International Search Report from PCT Application No. PCT/CN2017/106051 dated Jan. 31, 2018 (6 pages).
(Continued)

*Primary Examiner* — Nidhi Thaker
(74) *Attorney, Agent, or Firm* — Harness, Dickey & Pierce, P.L.C.

(57) ABSTRACT

The present application discloses a foldable display device, comprising a flexible screen and a support backplane cooperating therewith, the support backplane includes a first support plate and a second support plate hinged therewith by a rotary shaft system; a tension releasing mechanism is disposed at the first support plate or the second support plate, the flexible screen has a first end connected to the first support plate or the second support plate, and a second end opposite thereto, the second end is connected to the tension releasing mechanism, such that the second end of the flexible screen is slidable along a corresponding support plate between a first position in which the foldable display device is in an outward bending state and a second position in which the foldable display device is in a deployed state, and between the second position and a third position in which the foldable display device is in an inward bending state. This foldable display device can prevent the screen from damage as much as possible by providing a tension releasing mechanism.

8 Claims, 4 Drawing Sheets

(52) U.S. Cl.
CPC .......... *G06F 1/1626* (2013.01); *G06F 1/1641* (2013.01); *G06F 1/1681* (2013.01); *H04M 1/0268* (2013.01); *H04M 1/0214* (2013.01)

(56) References Cited

U.S. PATENT DOCUMENTS

| | | | | |
|---|---|---|---|---|
| 9,179,559 | B1* | 11/2015 | Kim | G06F 1/1616 |
| 9,811,119 | B2* | 11/2017 | Seo | G06F 1/1652 |
| 9,874,906 | B1* | 1/2018 | Hsu | G06F 1/1681 |
| 10,185,367 | B2* | 1/2019 | Kim | G06F 1/1675 |
| 2010/0041448 | A1* | 2/2010 | Gaddy | G06F 1/1616 |
| | | | | 455/575.3 |
| 2012/0002360 | A1 | 1/2012 | Seo et al. | |
| 2012/0264489 | A1 | 10/2012 | Choi et al. | |
| 2013/0010405 | A1 | 1/2013 | Rothkopf et al. | |
| 2014/0226275 | A1* | 8/2014 | Ko | G06F 1/1626 |
| | | | | 361/679.27 |
| 2015/0055287 | A1 | 2/2015 | Seo | |
| 2016/0062408 | A1 | 3/2016 | Lee et al. | |
| 2019/0037688 | A1 | 1/2019 | Shi | |

FOREIGN PATENT DOCUMENTS

| | | |
|---|---|---|
| CN | 105659187 A | 6/2016 |
| CN | 106157819 A | 11/2016 |
| CN | 107102692 A | 8/2017 |

OTHER PUBLICATIONS

Written Opinion from PCT Application No. PCT/CN2017/106051 dated Jan. 31, 2018 (5 pages).
Office Action from Chinese Application No. 201710283249.1 dated Apr. 2, 2019 (6 pages).

* cited by examiner

FOLDABLE DISPLAY DEVICE

The present application claims priority of the Chinese patent application No. 201710283249.1 submitted on Apr. 26, 2017, the disclosures of which are incorporated herein by reference in their entirety as part of the present application.

TECHNICAL FIELD

This disclosure generally relates to display device field, and in particular to a foldable display device.

BACKGROUND ART

In recent years, with the development of display technology, portable terminals such as mobile phones, tablet computers etc. have become extremely popular. However, these terminal devices have become less portable due to increase in size of portable terminals, e.g., mobile phones, tablet computers and so on.

The improvement in display technology encourages consumers to increasingly pursuit to comfortable experience and smart designs. Traditional palm display devices are substantially in the form of a single large screen, or slidable or flippable small screens. With the development of flexible display means, flexible display is becoming more and more popular. Then, novel and stable deign methods need to be searched based on the flexible display, in particular more humanized and reasonable design solutions should be proposed when new considerations are made as to more forms of flexible screens after people enjoy the visual impact created by the flexible screens.

A foldable display device is able to solve the problem in portability, wherein a screen in the foldable display device is a flexible screen. However, when the foldable display device is folded, a folded portion of the flexible screen has a radius of curvature approximate to or even smaller than a critical radius of curvature of the flexible screen, such that the flexible screen may be broken by a larger internal stress generated by folding.

At present there is a need to provide a novel foldable display device capable of solving the above problems.

SUMMARY OF THE INVENTION

The objective of the present disclosure is to provide a novel foldable display device, wherein a flexible screen can be bent inward or outward, and the flexible screen is provided with a flexible end and a movable end so that compression or extension of the flexible screen caused by inward or outward bending can be eliminated by moving the movable end, and then to remove the internal stress in the flexible screen generated by bending and protect the flexible screen, to the largest extent, not from being broken.

The present disclosure provides a foldable display device including a flexible screen and a support backplane cooperating with the flexible screen, the support backplane includes a first support plate and a second support plate hinged with the first support plate by a rotary shaft system, characterized in that a tension releasing mechanism is disposed at the first support plate or the second support plate, the flexible screen has a first end connected to the first support plate or the second support plate, and a second end opposite to the first end, the second end is connected to the tension releasing mechanism such that the second end of the flexible screen is slidable along a corresponding support plate between a first position in which the foldable display device is in an outward bending state and a second position in which the foldable display device is in a deployed state, and between the second position and a third position in which the foldable display device is in an inward bending state.

The foldable display device can be bent both inward and outward, and the second end that connects the flexible screen with the tension releasing mechanism can be moved by providing the tension releasing mechanism when the foldable display device is bent outward or inward, to eliminate compression or extension caused by inward or outward bending of the flexible screen, thereby avoiding compressive stress or tensile stress in the flexible screen to prevent the screen from breaking during folding.

According to a preferred embodiment, the tension releasing mechanism may be disposed at the second support plate, and includes a sliding member disposed between the flexible screen and the second support plate, at least one guide groove extending through a thickness of the second support plate and extending longitudinally along the second support plate, and at least one pre-tightening member arranged at a side of the flexible screen opposite to the second support plate, wherein the sliding member is connected to the at least one pre-tightening member and slidable along the at least one guide groove.

Advantageously, the first end of the flexible screen may be a fixed end connected fixedly to the first support plate, and the second end thereof may be a movable end connected to the sliding member, the sliding member is a plate-like member.

By providing such a tension releasing mechanism, the sliding member may move along the guide groove towards the first support plate because of a tensile force applied to the flexible screen when the foldable display device is bent outward, which drives the movable end of the flexible screen to move toward the first support plate to thereby reduce the tension in the flexible screen and protect the screen from damage; when the foldable display device is bent inward, the sliding member may move along the guide groove away from the first support plate, thus driving the movable end of the flexible screen to move away from the first support plate, so that the screen produces no folds and is protected from damage.

In the present disclosure, in order to improve the stability of the foldable display device, the at least one guide groove may include three guide grooves evenly spaced from each other in a transverse direction of the second support plate; the side of the sliding member facing the second support plate is provided with three bending parts; the at least one pre-tightening member may include three pre-tightening members, wherein the three bending parts extend through the three guide grooves and are connected to the three pre-tightening members, respectively. One skilled in the art should understand that the guide grooves, bending parts and pre-tightening members of other suitable numbers are also encompassed within the scope of this application according to a width of the foldable display device.

Advantageously, the three pre-tightening members may include a first pre-tightening member connected to the bending part of the sliding member extending through a middle guide groove, and two second pre-tightening members connected to two bending parts of the sliding member extending through two side guide grooves. It should be understood that the number of the first pre-tightening member may be the same or different from the second pre-tightening members.

In an aspect, the first pre-tightening member may be an elastic member having one end fixed to the second support plate and the other end connected to the first bending part. The elastic member, for example, may be made of memory alloys or rubber materials.

In an aspect, the second pre-tightening member may be composed of a guide post and a spring sleeved onto the guide post, wherein both ends of the guide post are fixed to the second support plate respectively, and one end of the spring is connected to the second bending part. Here, the spring may be a helical spring or other suitable elastic elements.

Advantageously, the foldable display device is further provided with a first back cover extending along the first support plate and a second back cover extending along the second support plate.

In an aspect, the foldable display device is further provided with a protective sleeve extending along the support back plate, the protective sleeve is made of a flexible material. By way of such a protective sleeve, the flexible screen can be prevented from damage more satisfactorily. Preferably, the flexible material includes fur, elastic rubber or ductile plastics.

In this disclosure, by virtue of the tension releasing mechanism with the sliding member, the flexible screen is configured to be fixed at one end and movable at the other end so as to bend the flexible screen outward and inward and eliminate compression or extension caused by the inward or outward bending. And then the flexible screen is prevent from being subjected to compressive stress or tensile stress to provide flexible screens of high stability and high yield, thereby greatly reducing the risk of abnormal display caused by the bending of flexible screen.

BRIEF DESCRIPTION OF THE DRAWINGS

The exemplary embodiments of the present disclosure are illustrated below with reference to the drawings.

DETAILED DESCRIPTION

Figure 1:
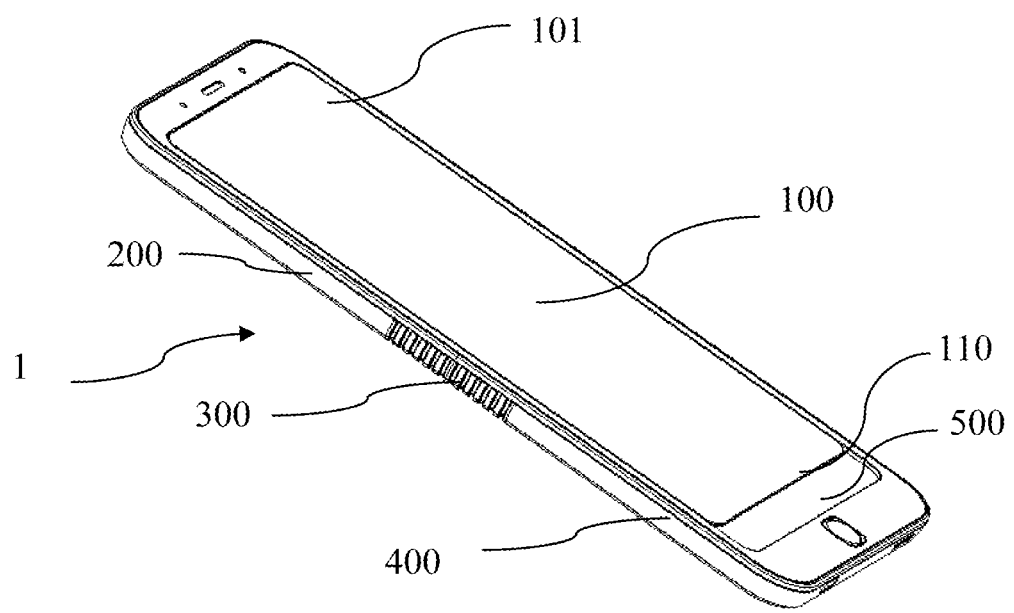
FIG. 1 is an overall view of the foldable display device in a deployed state according to an embodiment of the present disclosure.

The embodiments of the present disclosure are illustrated in detail below. The exemplary embodiments illustrated below and shown in the drawings are intended to teach the principle of the present disclosure so that one skilled in the art can implement and use the present disclosure under various circumstances and in various applications.

FIG. 1 is a perspective view of the foldable display device according to one embodiment of the present disclosure. As shown, the foldable display device 1 in this embodiment may include a flexible screen 100, and a support backplane cooperating with the flexible screen, the support backplane includes a first support plate 200 and a second support plate 400 hinged with the first support plate by a rotary shaft system 300.

Figure 2:
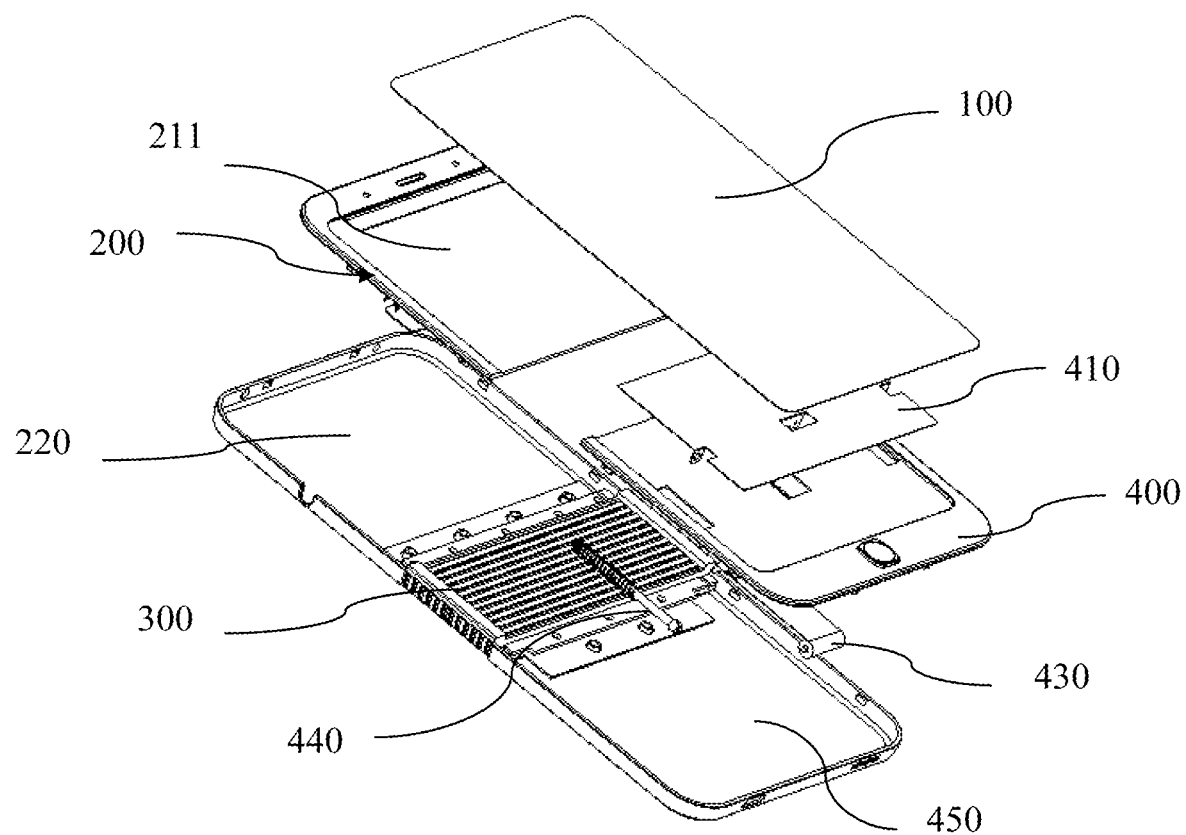
FIG. 2 is an exploded view of the foldable display device shown in FIG. 1.

FIG. 2 is an exploded view of the foldable display device as shown in FIG. 1. In this embodiment, a tension releasing mechanism is disposed at the second support plate 400. A first end 101 of the flexible screen 100 is connected to the first support plate 200, that is, the first end is snugly connected with a surface 211 of the first support plate to form a fixed end of the flexible screen. Specifically, the tension releasing mechanism includes a plate-like sliding member 410 which is arranged at a second end 110 of the flexible screen opposite to the first end 101 and at the second support plate 400, three guide grooves 401 extending through the thickness of the second support plate 400 and extending along the second support plate 400 longitudinally, and three pre-tightening members arranged at the side of the second support plate 400 opposite to the flexible screen, wherein the sliding member 410 is connected with the three pre-tightening members and slidable along the guide grooves.

The second end 110 of the flexible screen is connected to the sliding member 410 by being snugly connected with the surface of the sliding member 410, such that the second end (i.e. movable end) of the flexible screen is slidable in the guide groove 401 with the sliding member 410. To enable this sliding, a sliding space 500 is defined between the movable end of the flexible screen and an end of the second support plate.

Although in this embodiment, for the sake of stability of the foldable display device, there are three guide grooves and three pre-tightening members respectively, it should be understood that more or less guide grooves and pre-tightening members may be provided depending on a width of the foldable display device, in particular a width of the flexible screen. Here, it should be noted that preferably the number of the guide grooves and the pre-tightening members may be the same, but it may be different.

Figure 3:
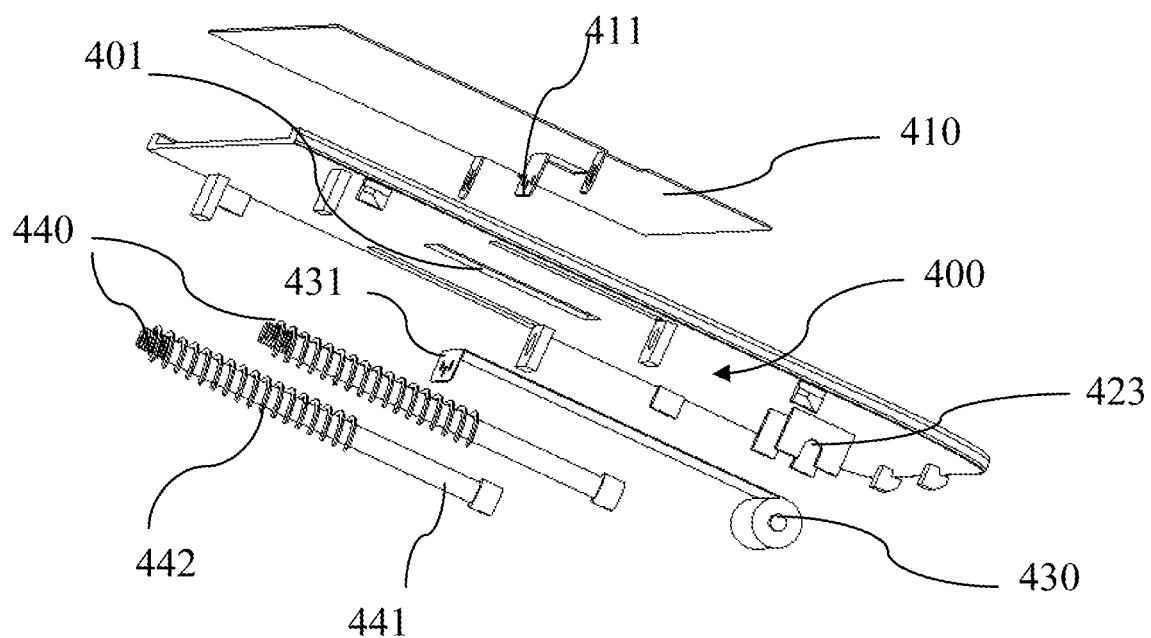
FIG. 3 is an exploded view of the tension releasing mechanism shown in FIG. 1.

Referring to FIG. 3, in order to movably attach the sliding member 410 to the second support plate 400, three bending parts 411 are disposed spaced apart on the sliding member 410, each of which can be respectively inserted into the three guide grooves 401 in the second support plate and extends beyond the guide groove so as to be connected to the three pre-tightening members at the side of the second support plate opposite to the flexible screen 100.

Figure 4A:
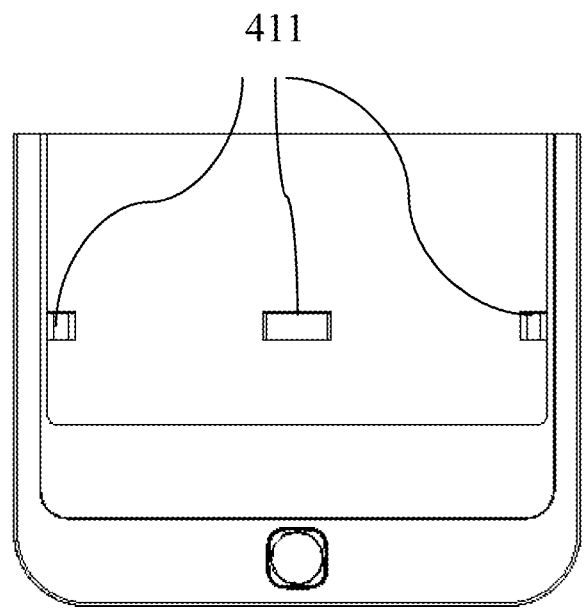
FIG. 4A is a schematic view showing a sliding member facing the flexible screen being assembled with a support plate.
Figure 4B:
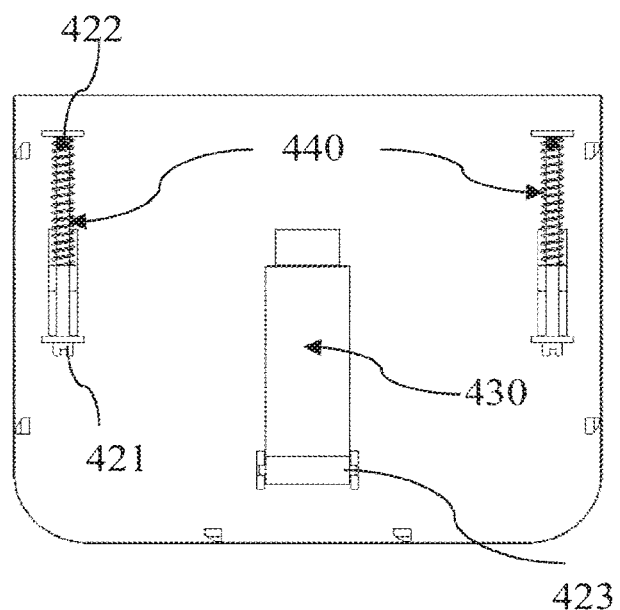
FIG. 4B is a schematic view showing a pre-tightening member being assembled with a support plate.

In an embodiment, referring to FIGS. 3, 4A, and 4B, the three pre-tightening members include a first pre-tightening member 430 and two second pre-tightening members 440, wherein the first pre-tightening member 430 is connected with the first bending part 411 of the sliding member 410 extending through a middle guide groove, and the second pre-tightening members are connected with two second bending parts of the sliding member 410 extending through two side guide grooves 401.

Preferably, the first pre-tightening member is an elastic strip, one end of which is connected to the second support plate by a mounting structure 423 on the second support plate 400, and the other end of which is configured as a bending structure 431, for example, the bending structure is connected to the first bending part 411 of the sliding member 410 extending through the middle guide groove by means of a fastener (not shown). Here, the elastic strip may be made of a material with curling ability, e.g. memory alloys or sheet-like rubbers and so on.

Figure 5:
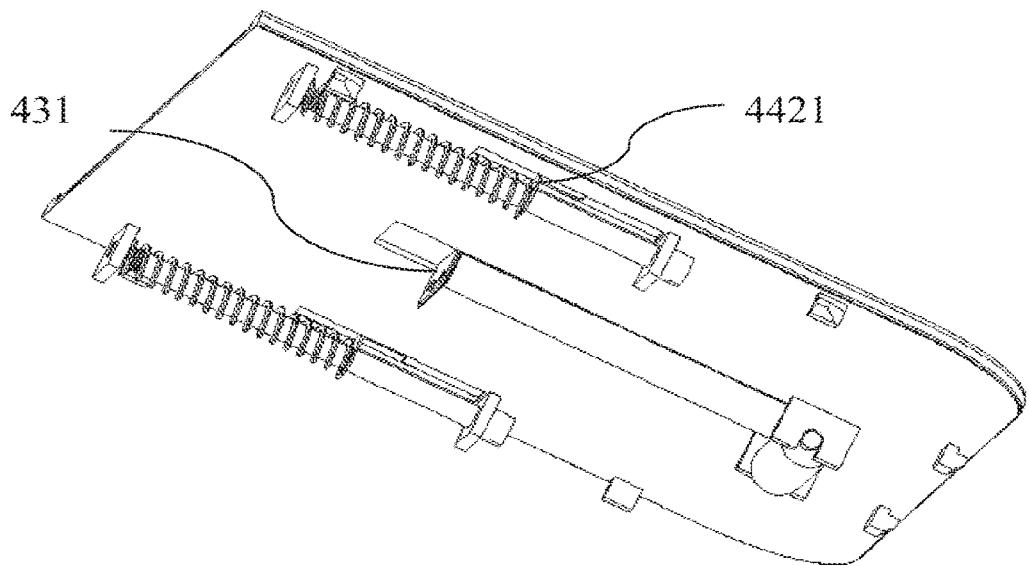
FIG. 5 is a perspective view of the configurations of FIGS. 4A and 4B.

In a preferred embodiment, referring to FIGS. 4B and 5, the second pre-tightening member 440 is formed by a guide post 441 and a helical spring 442 sleeved onto the guide post, wherein two ends of the guide post are fixedly mounted to the second support plate respectively by a mounting structure 421, 422 on the second support plate, and one end 4421 of the helical spring 442 is connected to the second bending part 411.

Also, it can be seen from FIG. 1, in this embodiment, the foldable display device is further provided with a first back cover 220 extending along the first support plate 200 and a second back cover 450 extending along the second support plate 400 for encapsulating other components of the foldable display device.

Alternatively, the separated first back cover and second back cover may be replaced by an integral protective sleeve, which may be made of a flexible material such as fur, elastic rubber or ductile plastics. Preferably, the protective sleeve is configured to form a compression portion adjacent to the rotary shaft system when it is in a slightly compressed state while the flexible screen is deployed.

Figure 6A:
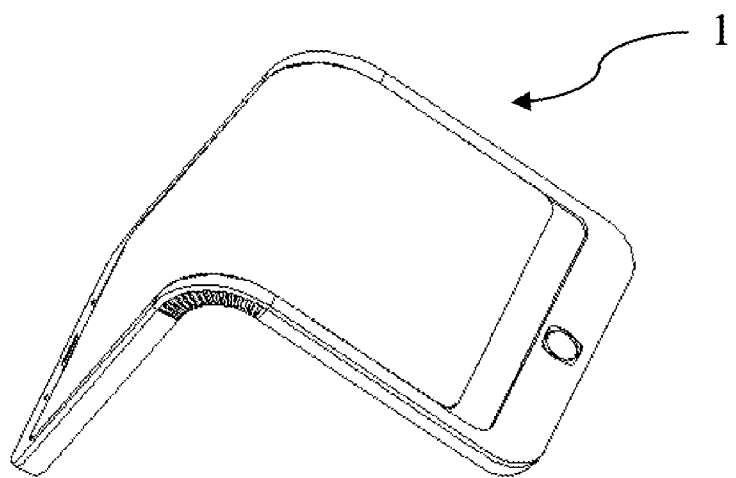
FIGS. 6A and 6B are schematic views showing the foldable display device of FIG. 1 that is folded outward and inward respectively.

As shown in FIG. 6A, when the foldable display device 1 is bent outward, the flexible screen 100 is subjected to a tensile stress, which causes the sliding member 410 to slide along a sliding groove 401 toward the rotary shaft system 300 to drive the second end of the flexible screen 100, i.e. the movable end to slide from a position in which the foldable display device is in a deployed state as shown in FIG. 1 to a position in which the foldable display device is bent outward as shown in FIG. 6A, i.e. toward the rotary shaft system 300, so as to release the tensile stress on the flexible screen 100 to protect it from damage.

Figure 6B:
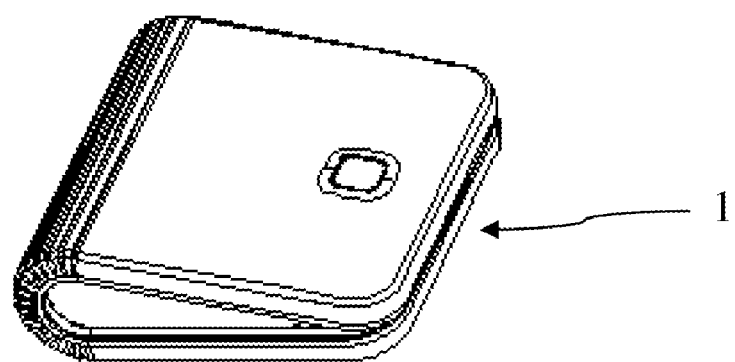

As shown in FIG. 6B, when the foldable display device 1 is bent inward, the flexible screen 100 is subjected to a compressive tension, which causes the sliding member 410 to slide along the sliding groove 401 away the rotating shaft means 300 to drive the movable end of the flexible screen 100 to slide from a position in which the foldable display device is in a deployed state as shown in FIG. 1 to a position in which the foldable display device is bent inward as shown in FIG. 6B, i.e. away from the rotating shaft means 300, so as to release the tension on the flexible screen 100 to protect it from damage.

The foldable display device according to this disclosure can be bent inward and outward, and protect the screen, to the largest extent, from being broken, and can be fixed and operated at any bending angle.

The display device may be any product or component with display function such as an OLED panel, a mobile phone, a tablet computer, a display screen, a laptop, a computer, a digital photo frame, a navigator and so on.

It should be understood that the above illustration is only exemplary. One skilled in the art can make various modifications and variants according to the embodiments in this disclosure, which modifications and variants being encompassed within the protection scope of the present disclosure.

The invention claimed is:

1. A foldable display device, comprising:
   a flexible screen; and
   a support backplane in cooperation with the flexible screen, the support backplane including a first support plate and a second support plate hinged with the first support plate by a rotary shaft system, wherein:
   a tension releasing mechanism is disposed at the second support plate, the tension releasing mechanism including a sliding member arranged between the flexible screen and the second support plate, three guide grooves extending through a thickness of the second support plate and extending longitudinally along the second support plate, and three pre-tightening members arranged at a side of the second support plate opposite to the flexible screen, wherein the sliding member is connected with the three pre-tightening members and is slidable along the three guide grooves, a side of the sliding member facing the second support plate includes three bending parts, a first one of the three pre-tightening members is an elastic member, one end of the elastic member is fixed to the second support plate and the other end of the elastic member is connected to a first one of the three bending parts;
   the flexible screen has a first end connected to the first support plate or the second support plate, and a second end opposite to the first end; and
   the second end is connected to the tension releasing mechanism with the second end of the flexible screen slidable along a corresponding support plate between a first position in which the foldable display device is in an outward bending state and a second position in which the foldable display device is in a deployed state, and between the second position and a third position in which the foldable display device is in an inward bending state.

2. The foldable display device according to claim 1, wherein the first end of the flexible screen is a fixed end connected fixedly to the first support plate, the second end is a movable end connected to the sliding member, and the sliding member is a plate-like member.

3. The foldable display device according to claim 1, wherein:
   the three guide grooves are evenly spaced from each other in a transverse direction of the second support plate; and
   the three bending parts extend through the three guide grooves respectively and are connected with the three pre-tightening members respectively.

4. The foldable display device according to claim 3, wherein the first one of the three bending parts of the sliding member extends through a middle one of the guide grooves, and second and third ones of the three pre-tightening members are connected with corresponding second and third ones of the three bending parts of the sliding member extending through two side ones of the guide grooves.

5. The foldable display device according to claim 4, wherein the second pre-tightening member includes a guide post and a spring sleeved onto the guide post, both ends of the guide post are fixed to the second support plate, and one end of the spring is connected to the second bending part.

6. The foldable display device according to claim 1, wherein the elastic member includes memory alloys or rubber materials.

7. The foldable display device according to claim 1, wherein the foldable display device includes a first back cover extending along the first support plate and a second back cover extending along the second support plate.

8. The foldable display device according to claim 1, further comprising a protective sleeve that extends along the support back plate and includes a flexible material.

* * * * *